(12) United States Patent
Wang

(10) Patent No.: US 10,659,760 B2
(45) Date of Patent: May 19, 2020

(54) ENHANCED HIGH-LEVEL SIGNALING FOR FISHEYE VIRTUAL REALITY VIDEO

(71) Applicant: QUALCOMM Incorporated, San Diego, CA (US)

(72) Inventor: Yekui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/028,934

(22) Filed: Jul. 6, 2018

(65) Prior Publication Data

US 2019/0014305 A1  Jan. 10, 2019

Related U.S. Application Data

(60) Provisional application No. 62/530,497, filed on Jul. 10, 2017.

(51) Int. Cl.
*H04N 13/167* (2018.01)
*H04N 13/161* (2018.01)
*H04N 21/81* (2011.01)
*H04N 13/194* (2018.01)
*H04N 21/44* (2011.01)
(Continued)

(52) U.S. Cl.
CPC ....... *H04N 13/167* (2018.05); *H04N 5/23238* (2013.01); *H04N 13/161* (2018.05); *H04N 13/178* (2018.05); *H04N 13/194* (2018.05); *H04N 13/243* (2018.05); *H04N 19/46* (2014.11); *H04N 19/597* (2014.11); *H04N 19/70* (2014.11); *H04N 21/44* (2013.01); *H04N 21/816* (2013.01); *H04N 21/85406* (2013.01)

(58) Field of Classification Search
CPC .......... H04N 13/167; H04N 21/85406; H04N 19/70; H04N 19/597; H04N 19/46; H04N 21/816; H04N 21/44; H04N 13/194; H04N 13/161; H04N 5/23238
See application file for complete search history.

(56) References Cited

U.S. PATENT DOCUMENTS 10,194,097 B2  1/2019  Abbas et al.
2012/0081516 A1*  4/2012  Tsukagoshi .......... H04N 21/236
                                                             348/43
(Continued)

OTHER PUBLICATIONS

Choi B., et al., "OMAF DIS Text with Updates Based on Berlin OMAF AHG Meeting Agreements," 119. MPEG Meeting; Jul. 17, 2017-Jul. 21, 2017; Torino; (Motion Picture Expert Group or ISO/IEC JTC1/SC29/WG11),, No. m40849, Jun. 16, 2017, XP030069193, 70 pages.
(Continued)

*Primary Examiner* — Tracy Y. Li
(74) *Attorney, Agent, or Firm* — Shumaker & Sieffert, P.A.

(57) ABSTRACT

A method of processing a file including video data, including processing a file including fisheye video data, the file including a syntax structure including a plurality of syntax elements that specify attributes of the fisheye video data, wherein the plurality of syntax elements include one or more bits that indicate fisheye video type information, determining, based on the one or more bits of the syntax structure, the fisheye video type information for the fisheye video data, outputting, based on the determination, the fisheye video data for rendering.

30 Claims, 8 Drawing Sheets

(51) Int. Cl.
| | |
|---|---|
| *H04N 5/232* | (2006.01) |
| *H04N 21/854* | (2011.01) |
| *H04N 19/46* | (2014.01) |
| *H04N 19/597* | (2014.01) |
| *H04N 19/70* | (2014.01) |
| *H04N 13/178* | (2018.01) |
| *H04N 13/243* | (2018.01) |

(56) References Cited

U.S. PATENT DOCUMENTS

| | | | |
|---|---|---|---|
| 2017/0347026 A1 | 11/2017 | Hannuksela | |
| 2018/0376126 A1* | 12/2018 | Hannuksela | ......... H04N 19/176 |
| 2019/0014304 A1* | 1/2019 | Curcio | ............ H04N 21/21805 |

OTHER PUBLICATIONS

International Search Report and Written Opinion—PCT/US2018/041302—ISO/EPO—dated Sep. 19, 2018.
Wang Y-K., (Qualcomm): "[OMAF] On Signalling of Stereoscopic Omnidirectional Video", 119, MPEG Meeting, Jul. 17, 2017-Jul. 21, 2017, Torino, (Motion Picture Expert Group or ISO/IEC JTC1/SC29/WG11), No. m40999, Jul. 10, 2017 (Jul. 10, 2017), XP030069343, 6 Pages.
Y-K Wang (Qualcomm): "[OMAF] Comments on OMAF DIS text", 119. MPEG Meeting; Jul. 17, 2017-Jul. 21, 2017; Torino; (Motion Picture Expert Group or ISO/IEC JTC1/SC29/WG11), No. m40783, May 26, 2017 (May 26, 2017), XP030069127, 4 pages.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pages.
"International Standard ISO/IEC 23008-2, Information Technology-High efficiency coding and media delivery in heterogeneous environments—Part 2 High efficiency video coding," First Edition, Dec. 1, 2013, 312 pp.
International Standard ISO/IEC 14496-12, Information Technology—Coding of audio-visual objects—Part 12: ISO base media file format, Third Edition, Oct. 15, 2008, 120 pp.
"Text of ISO/IEC FDIS 14496-15:2010 3rd edition Carriage of NAL unit structured video in the ISO BMFF", 104, MPEG Meeting; Apr. 22, 2013-Apr. 26, 2013; Incheon; (Motion Picture Expert Group or ISO/IEC JTC1/SC29/WG11), No. N13478, Jun. 8, 2013 (Jun. 8, 2013), 118 Pages, XP030020228.
Digital cellular telecommunications system (Phase 2+); Universal Mobile Telecommunications System (UMTS); LTE; Transparent end-to-end packet switched streaming service (PSS); 3GPP file format (3GP) (3GPP TS 26.244 version11.1. Release 11), Oct. 2012, 62 pp.
ISO/IEC 23009-1: "Information technology—Dynamic adaptive streaming over HTTP (DASH)—Part 1: Media presentation description and segment formats," Technologies de l' information—Diffusion en flux adaptatif dynamique sur HTTP (DASH)—Part 1: Description of the presentation and delivery of media formats, ISO/IEC 23009-1 International Standard, First Edition, Apr. 2012, XP002712145, 132 pp.
Fielding R., et al., "Hypertext Transfer Protocol—HTTP/1.1", Network Working Group, RFC 2616, Jun. 1999, pp. 1-176.
Paila T., et al., "FLUTE—File Delivery over Unidirectional Transport; rfc6726.txt," Internet Engineering Task Force, IETF; Standard, Internet Society (ISOC) 4, Rue Des Falaises CH-1205 Geneva, Switzerland, Nov. 6, 2012 (Nov. 6, 2012), pp. 1-46.
Choi B., et al., "Text of ISO/IEC FDIS 23090-2 Omnidirectional Media Format1," 120. MPEG Meeting; Oct. 23, 2017-Oct. 27, 2017; MACAU; (Motion Picture Expert Group or ISO/IEC JTC1/SC29/WG11),, No. n17235, Oct. 31, 2017, XP030070264, pp. 1-123.
U.S. Appl. No. 16/028,974, filed by Ye-Kui Wang, et al., filed Jul. 6, 2018.
3GPP TS 26.244 V12.2.0, 3rd Generation Partnership Project; Technical Specification Group Services and System Aspects; Transparent end-to-end packet switched streaming service (PSS); 3GPP file format (3GP), (Release 12), Dec. 2013, 61 pp.
"Information technology—Coding of audio-visual objects—Part 15: Carriage of network abstraction layer (NAL) unit structured video in the ISO base media file format," International Standard Organization, ISO/IEC FDIS 14496-15-2014; Jan. 13, 2014, 179 pp.
Choi B., et al., "Text of ISO/IEC DIS 23090-2 Omnidirectional Media Format," 118. MPEG Meeting; Apr. 3, 2017-Apr. 7, 2017; Hobart; (Motion Picture Expert Group or ISO/IEC JTC1/SC29WG11), No. N16824, Apr. 28, 2017, 63 pages, XP030023490.
Deshpande (Sharp) S: "DASH Signaling of OMAF Information," 118. MPEG Meeting: Apr. 3, 2017-Apr. 7, 2017; Hobart; (Motion Picture Expert Group or ISO/IEC JTC1/SC29/WG11),, No. m40500, Mar. 29, 2017, 20 pages, XP030068845.
Hannuksela M.M., et al., "OMAF Signaling in DASH," 118. MPEG Meeting; Apr. 3, 2017-Apr. 7, 2017; Hobart; (Motion Picture Expert Group or ISO/IEC JTC1/SC29/WG11), No. M40468, Mar. 28, 2017, 4 pages, XP030068813.

* cited by examiner

ENHANCED HIGH-LEVEL SIGNALING FOR FISHEYE VIRTUAL REALITY VIDEO

This application claims the benefit of U.S. Provisional Application No. 62/530,497, filed Jul. 10, 2017, the entire content of which is hereby incorporated by reference.

TECHNICAL FIELD

This disclosure relates to the transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video (and other media data) data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes functionality relating to virtual reality (VR)/360 degree video applications. More specifically, this disclosure describes enhanced high-level signaling for fisheye VR/360 video, in both container files and in the media presentation description of adaptive streaming formats such as dynamic adaptive streaming over HTTP (DASH). Although the techniques may be described herein in the context of the Omnidirectional MediA Format (OMAF) and/or DASH, or in other media formats, it should be understood that such techniques may apply generally to any virtual reality (VR) or 360 degree media formats. Also, although this disclosure may refer to file formats in the form of ISO base media file format (ISOBMFF), it should be understood that such file formats may apply generally across a variety of types of file formats.

In one example, this disclosure describes a method of processing a file including video data, the method comprising processing a file including fisheye video data, the file including a syntax structure including a plurality of syntax elements that specify attributes of the fisheye video data, wherein the plurality of syntax elements include one or more bits that indicate fisheye video type information, determining, based on the one or more bits of the syntax structure, the fisheye video type information for the fisheye video data, and outputting, based on the determination, the fisheye video data for rendering.

In another example, this disclosure describes an apparatus configured to process a file including video data, the apparatus comprising a memory configured to store the file, and one or more processors in communication with the memory, the one or more processors configured to process the file including fisheye video data, the file including a syntax structure including a plurality of syntax elements that specify attributes of the fisheye video data, wherein the plurality of syntax elements include one or more bits that indicate fisheye video type information, determine, based on the one or more bits of the syntax structure, the fisheye video type information for the fisheye video data, and output, based on the determination, the fisheye video data for rendering.

In another example, this disclosure describes an apparatus configured to process a file including video data, the apparatus comprising means for processing a file including fisheye video data, the file including a syntax structure including a plurality of syntax elements that specify attributes of the fisheye video data, wherein the plurality of syntax elements include one or more bits that indicate fisheye video type information, means for determining, based on the one or more bits of the syntax structure, the fisheye video type information for the fisheye video data, and means for outputting, based on the determination, the fisheye video data for rendering.

In another example, this disclosure describes a non-transitory computer-readable storage medium storing instructions that, when executed, cause one or more processors to process a file including fisheye video data, the file including a syntax structure including a plurality of syntax elements that specify attributes of the fisheye video data, wherein the plurality of syntax elements include one or more bits that indicate fisheye video type information, determine, based on the one or more bits of the syntax structure, the fisheye video type information for the fisheye video data, and output, based on the determination, the fisheye video data for rendering.

In another example, this disclosure describes a method of generating a file including video data, the method comprising receiving fisheye video data, generating a file including the fisheye video data, the file including a syntax structure including a plurality of syntax elements that specify attributes of the fisheye video data, wherein the plurality of syntax elements include one or more bits that indicate fisheye video type information, and outputting the file.

In another example, this disclosure describes an apparatus configured to generate a file including video data, the apparatus comprising a memory configured to store the file, and one or more processors in communication with the memory, the one or more processors configured to receive fisheye video data, generate the file including the fisheye video data, the file including a syntax structure including a plurality of syntax elements that specify attributes of the fisheye video data, wherein the plurality of syntax elements include one or more bits that indicate fisheye video type information, and output the file.

In another example, this disclosure describes an apparatus configured to generate a file including video data, the apparatus comprising means for receiving fisheye video data means for generating a file including the fisheye video data, the file including a syntax structure including a plurality of syntax elements that specify attributes of the fisheye video data, wherein the plurality of syntax elements include one or more bits that indicate fisheye video type information, and means for outputting the file.

In another example, this disclosure describes a non-transitory computer-readable storage medium storing instructions that, when executed, cause one or more processors to receive fisheye video data, generate a file including the fisheye video data, the file including a syntax structure including a plurality of syntax elements that specify attributes of the fisheye video data, wherein the plurality of syntax elements include one or more bits that indicate fisheye video type information, and output the file.

The details of one or more examples are set forth in the accompanying drawings and the description below. Other features, objects, and advantages will be apparent from the description and drawings, and from the claims.

DETAILED DESCRIPTION

Figure 1:
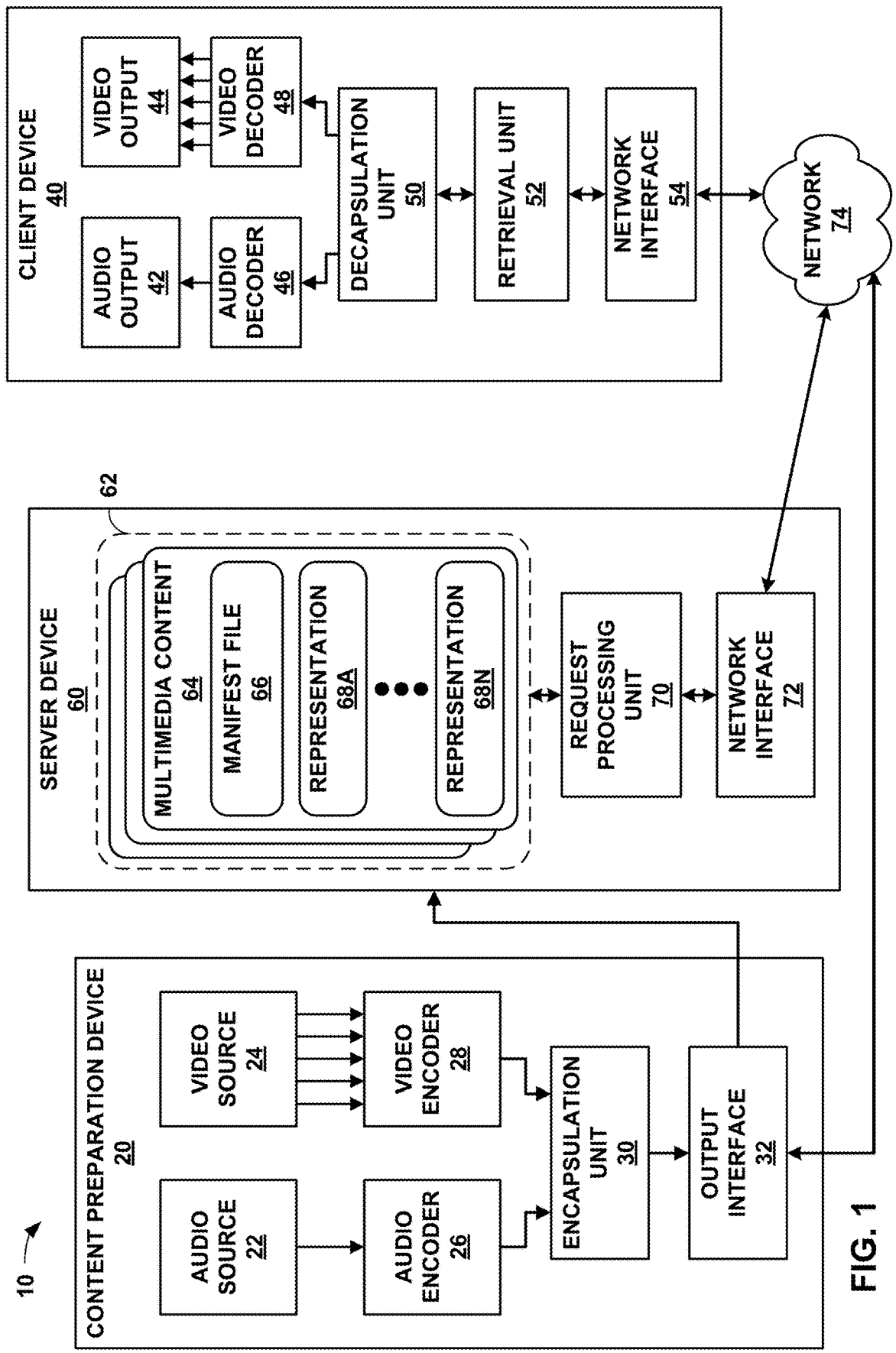
FIG. 1 is a block diagram illustrating an example system that implements techniques for streaming media data over a network.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of examples of the disclosure. However, it will be apparent that various examples may be practiced without these specific details. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing an example of the disclosure. It should be understood that various changes may be made in the function and arrangement of elements without departing from the spirit and scope of the application as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, examples of the disclosure may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

In general, this disclosure describes some enhanced designs, devices, and techniques for high-level signaling for fisheye virtual reality (VR) video (e.g., also called 360-degree video or omnidirectional video data). Although the techniques may be described herein in the context of the Omnidirectional MediA Format (OMAF), it should be understood that such functionality may apply generally to any VR, omnidirectional or 360-degree media formats. Also, although this disclosure may refer to file formats in the form of ISO base media file format (ISOM/WE), it should be understood that such file formats may apply generally across a variety of types of file formats. For example, this disclosure discloses multiple example methods of alternative signaling of fisheye video information. One or more of these methods may be performed independently, or in any combination.

Associated video coding standards include ITU-T H.261, ISO/IEC MPEG-1 Visual ITU-T H.262 or ISO/IEC MPEG-2 Visual, ITU-T H.263, ISO/IEC MPEG-4 Visual ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC). A new video coding standard called Versatile Video Coding (VVC) or ITU-T H.266 is being developed by the Joint Video Experts Team (JVET).

File format standards include ISO base media file format (ISOBMFF, ISO/IEC 14496-12), and other derived from the ISOBMFF, including MPEG-4 file format (ISO/IEC 14496-15), 3GPP file format (3GPP TS 26.244) and file formats for AVC and HEVC families of video codecs (ISO/IEC 14496-15). The draft texts of recent new editions for ISO/IEC 14496-12 and 14496-15 are available at http://phenix.int-evey.fr/mpeg/doc_end_user/documents/111_Geneva/wg11/w15177-v6-w15177.zip and http://wg11.sc29.org/doc_end_user/documents/115_Geneva/wg11/w16169-v2-w16169.zip, respectively.

The ISOBMFF is used as the basis for many codec encapsulation formats, such as the AVC file format, as well as for many multimedia container formats, such as the MPEG-4 file format, the 3GPP file format (3GP), and the DVB file format.

In addition to continuous media, such as audio and video, static media, such as images, as well as metadata can be stored in a file conforming to ISOBMFF. Files structured according to the ISOBMFF may be used for many purposes, including local media file playback, progressive downloading of a remote file, segments for adaptive streaming techniques such as Dynamic Adaptive Streaming over HTTP (DASH), HTTP Live Steam (HLS), etc., that utilize containers for content to be streamed and its packetization instructions, and recording of received real-time media streams.

A box is the elementary syntax structure in the ISOBMFF, including a four-character coded box type, the byte count of the box, and the payload. An ISOBMFF file consists of a sequence of boxes, and boxes may contain other boxes. A Movie box ("moov") contains the metadata for the continuous media streams present in the file, each one represented in the file as a track. The metadata for a track is enclosed in a Track box ("trak"), while the media content of a track is either enclosed in a Media Data box ("mdat") or directly in a separate file. The media content for tracks consists of a sequence of samples, such as audio or video access units.

The ISOBMFF specifies the following types of tracks: a media track, which contains an elementary media stream, a hint track, which either includes media transmission instructions or represents a received packet stream, and a timed metadata track, which comprises time-synchronized metadata.

Although originally designed for storage, the ISOBMFF has proven to be very valuable for streaming, e.g., for progressive download or DASH. For streaming purposes, the movie fragments defined in ISOBMFF can be used.

The metadata for each track includes a list of sample description entries, each providing the coding or encapsulation format used in the track and the initialization data needed for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF.

Dynamic adaptive streaming over HTTP (DASH), specified in ISO/IEC 23009-1, is a standard for HTTP (adaptive) streaming applications. DASH specifies the format of a media presentation description (MPD), also known as manifest, and the media segment format. The MPD describes the media available on the server and lets the DASH client autonomously download the media version at the media time it is interested in.

One example of a typical procedure for DASH based HTTP streaming includes the following steps:
1) A DASH client obtains the MPD of a streaming content, e.g., a movie. The MPD includes information on different alternative representations, e.g., bit rate, video resolution, frame rate, audio language, of the streaming content, as well as the URLs of the HTTP resources (the initialization segment and the media segments).
2) Based on information in the MPD and the DASH client's local information, e.g., network bandwidth, decoding/display capabilities and user preference, the client requests the desired representation(s), one segment (or a part thereof, e.g., a partial segment) at a time.
3) When the DASH client detects a network bandwidth change, the DASH client requests segments of a different representation with a better-matching bitrate, ideally starting from a segment that starts with a random access point.

During an HTTP streaming "session," to respond to a user request to seek backward to a past position or forward to a future position, the DASH client requests past or future segments starting from a segment that is close to the user-requested position and that ideally starts with a random access point. The user may also request to fast-forward the content, which may be realized by requesting data sufficient for decoding only the intra-coded video pictures or only a temporal subset of the video stream.

In HTTP streaming, such as DASH, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and ITU-T H.265/High Efficiency Video Coding (HEVC), define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile.

Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., via routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

As will be described in more detail below, content preparation device 20 may be configured to receive fisheye video data, generate a file including the fisheye video data, the file including a syntax structure including a plurality of syntax elements that specify attributes of the fisheye video data, wherein the plurality of syntax elements include one or more bits that indicate fisheye video type information, and output the file. Similarly, client device 40 may be configured to process a file including fisheye video data, the file including a syntax structure including a plurality of syntax elements that specify attributes of the fisheye video data, wherein the plurality of syntax elements include one or more bits that indicate fisheye video type information, determine, based on the one or more bits of the syntax structure, the fisheye video type information for the fisheye video data, and output, based on the determination, the fisheye video data for rendering.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than send the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
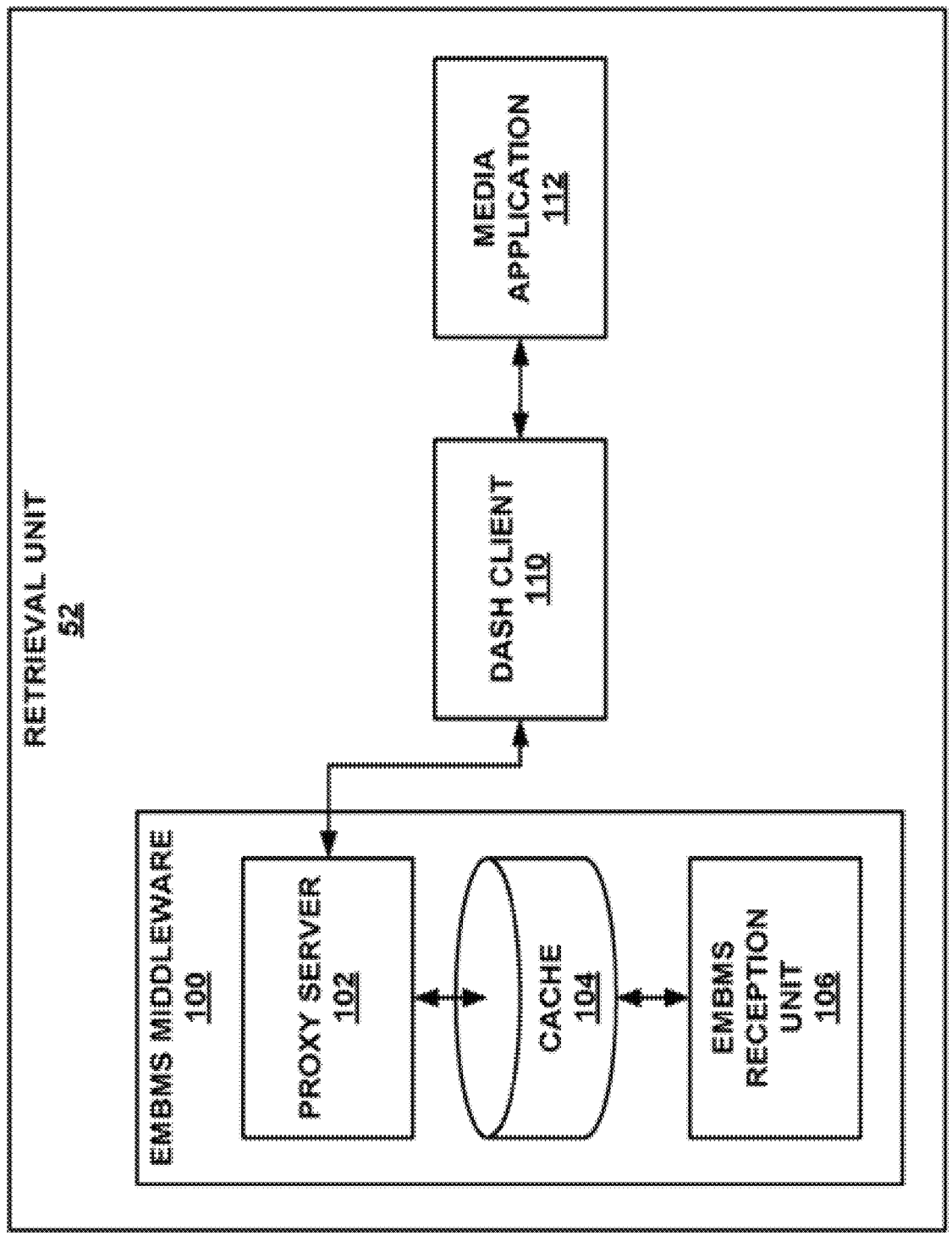
FIG. 2 is a block diagram illustrating an example set of components of a retrieval unit of FIG. 1 in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a broadcast multicast service center (BM-SC).

As eMBMS middleware unit 100 receives data for files, eMBMS middleware unit 100 may store the received data in cache 104. Cache 104 may comprise a computer-readable storage medium, such as flash memory, a hard disk, RAM, or any other suitable storage medium.

Proxy server 102 may act as a server for DASH client 110. For example, proxy server 102 may provide a MPD file or other manifest file to DASH client 110. Proxy server 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server 102. Proxy server 102 may retrieve requested data from cache 104 and provide the data to DASH client 110 in response to such requests.

In accordance with the techniques of this disclosure, encapsulation unit 30 may signal, and retrieval unit 52 may receive, important video information related to any or all of video data stored using a restricted scheme, high dynamic range/wide color gamut (HDR/WCG) video, VR/omnidirectional/360 video, frame packed video, and video with display orientation changes, such that the important video information can be conveniently accessed by application clients, such as DASH clients, to make content rejection/selection/accepting/requesting decisions. As noted above, important video information may include information that may be used for content selection, e.g., selection by retrieval unit 52 of a video track or a part thereof for consumption.

Figure 3:
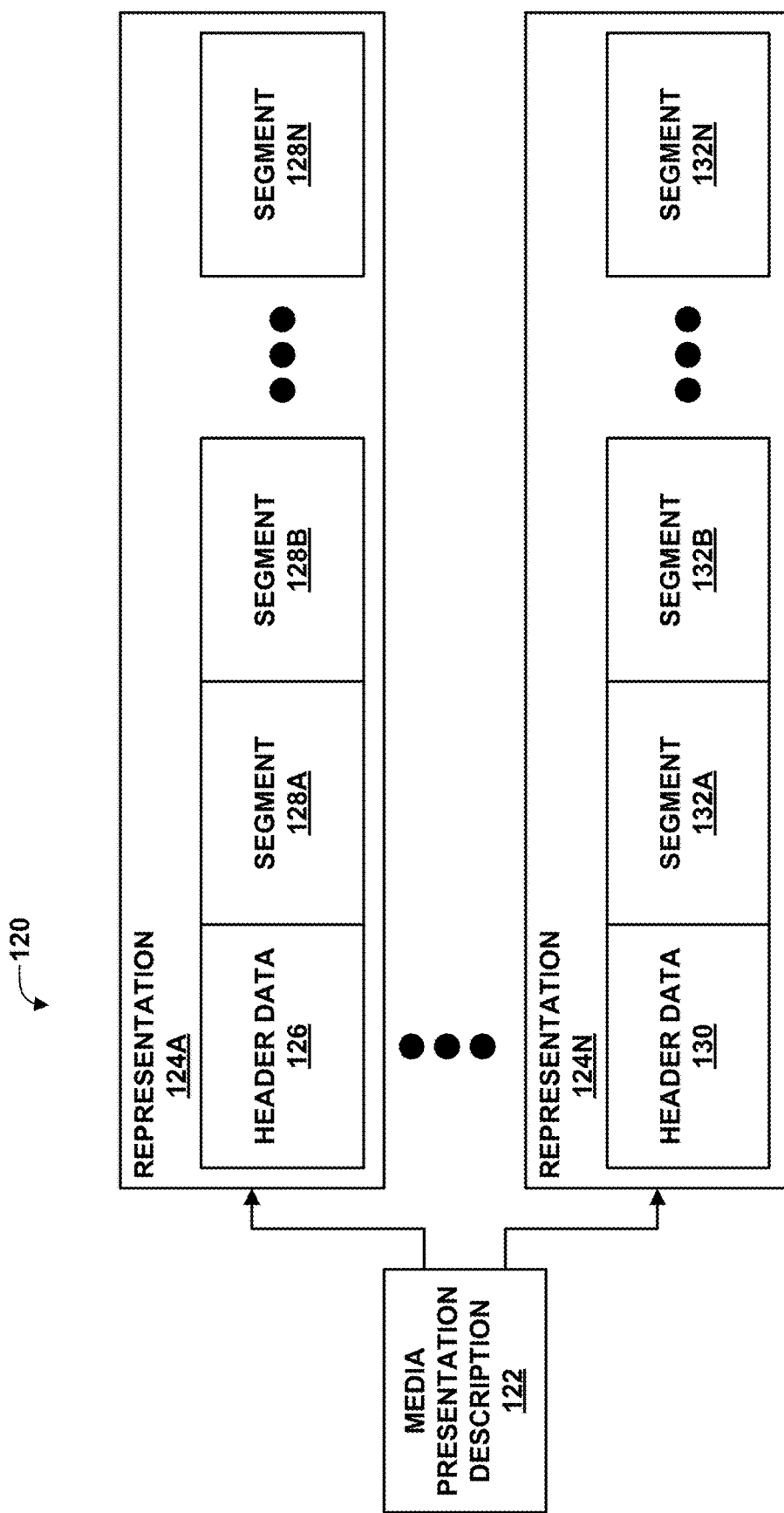
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
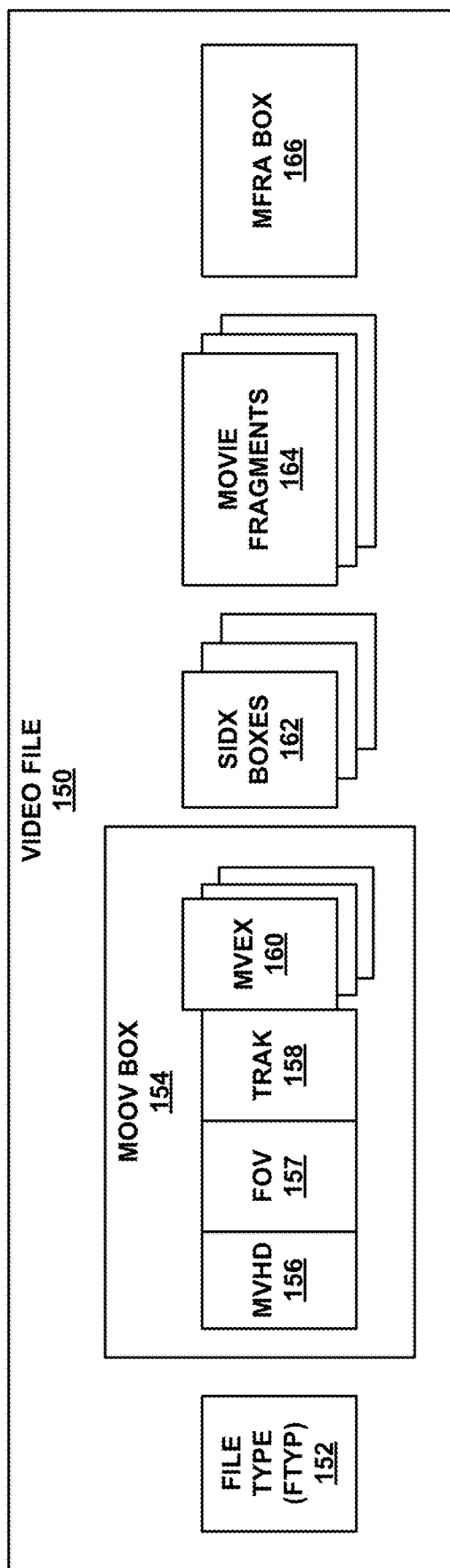
FIG. 4 is a block diagram illustrating elements of an example video file, which may correspond to a segment of a representation.

FIG. 4 is a block diagram illustrating elements of an example video file 150, which may correspond to a segment of a representation, such as one of segments 114, 124 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, field of view (FOV) box 157, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track. {TRAK box 158 may also include the Sample Table box (stbl) as described in this disclosure. Such Sample Table may further include the Sync Sample box (stss)}

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

In accordance with the techniques of this disclosure, MOOV box 154 may include one or more boxes (such as a SchemeInformationBox and/or a RestrictedSchemeInfoBox) that indicates whether either or both of rotation and/or flipping is applied to video data included in movie fragments 164. Additionally or alternatively, MOOV box 154 may contain important information of HDR/WCG video.

Virtual reality (VR) is the ability to be virtually present in a non-physical world created by the rendering of natural and/or synthetic image and sound correlated by the movements of the immersed user allowing to interact with that world. With the recent progress made in rendering devices, such as head mounted displays (HMD), and VR video (often also referred to as 360-degree video or omnidirectional video) creation, a significant quality of experience can be offered. VR applications include gaming, training, education, sports video, online shopping, adult entertainment, and so on.

One example of a VR system includes the following components and steps:

1) A camera set, which typically consists of multiple individual cameras pointing to different directions and ideally collectively covering all viewpoints around the camera set.
2) Image stitching, where video pictures taken by the multiple individual cameras are synchronized in the time domain and stitched in the space domain, to be a spherical video, but mapped to a rectangular format, such as equi-rectangular (like a world map) or cube map.
3) The video in the mapped rectangular format is encoded/compressed using a video codec, e.g., H.265/HEVC or H.264/AVC or other video coding standards.
4) The compressed video bitstream(s) may be stored and/or encapsulated in a media format and transmitted (possibly only the subset covering only the area being seen by a user is transmitted) through a network to a receiver.
5) The receiver receives the video bitstream(s) or part thereof, possibly encapsulated in a format, and sends the decoded video signal or part thereof to a rendering device.
6) The rendering device can be e.g., an HMD, which can track head movement and even eye move moment and render the corresponding part of the video such that an immersive experience is delivered to the user.

At the time of writing of this document, the Omnidirectional MediA Format (OMAF) was being developed by MPEG to define a media format that enables omnidirectional media applications, focusing on VR applications with 360° video and associated audio. It firstly specifies a list of projection methods that can be used for conversion of a spherical or 360° video into a two-dimensional rectangular video, followed by how to store omnidirectional media and the associated metadata using the ISO base media file format (ISOBMFF) and how to encapsulate, signal, and stream omnidirectional media using dynamic adaptive streaming over HTTP (DASH), and finally which video and audio codecs as well as media coding configurations can be used for compression and playback of the omnidirectional media signal.

OMAF would become ISO/IEC 23090-2, and at the time of this writing, its latest draft specification can be found at: http://wg11.sc29.org/doc_end_user/documents/119_Torino/wg11/m40849-v1-m40849_OMAF_text_Berlin_output.zip.

Example techniques described in this disclosure are related to high-level signaling for omnidirectional video or image data. When omnidirectional media content is consumed with certain devices (e.g., a head-mounted display and headphones), only the parts of the media that correspond to the user's viewing orientation are rendered, as if the user were in the spot where and when the media was captured (e.g., where the cameras(s) were). One of the most popular forms of omnidirectional media applications is omnidirectional video, also known as 360-degree video. Omnidirectional video is typically captured by multiple cameras that cover up to 360-degrees of the scene, e.g., as described above.

In general, omnidirectional video is formed from a sequence of omnidirectional images. Accordingly, the example techniques described in this disclosure are described with respect to generating omnidirectional image content. Then, for omnidirectional video content, these omnidirectional images can be displayed sequentially. In some examples, a user may desire to take only an omnidirectional image (e.g., as a snapshot of the entire 360-degree surrounding of the user), and the techniques described in this disclosure are applicable to such example cases as well.

Omnidirectional video may be stereoscopic or monoscopic. When the video is stereoscopic, a different image is shown to each eye such that the viewer may perceive depth. As such, stereoscopic video is typically captured using two cameras facing each direction. When the video is monoscopic, the same image is shown to both eyes.

Video data may be considered to be fisheye video data where it is captured using one or more fisheye lenses (or generated to appear as if captured using one or more fisheye lenses). A fisheye lens may be an ultra wide-angle lens that produces strong visual distortion intended to create a wide panoramic or hemispherical image.

The techniques of this disclosure may be applicable to captured video content, VR, and generally to video and image displaying. The techniques may be used in mobile devices, but the techniques should not be considered limited to mobile applications. In general, the techniques may be for virtual reality applications, video game applications, or other applications where a 360-degree spherical video/image environment is desired.

In some examples, the omnidirectional image content may be captured with a camera device that includes two fisheye lenses. Where the two fisheye lenses are positioned on opposing sides of the camera device to capture opposite portions of the sphere of image content, the image content may be monoscopic and cover the full sphere of the 360-degree video. Similarly, where the two fisheye lenses are positioned on the same side of the camera device to capture the same portion of the sphere of image content, the image content may be stereoscopic and cover half of the sphere of the 360-degree video. The images generated by the cameras are circular images (e.g., one image frame includes two circular images).

Figure 5B:
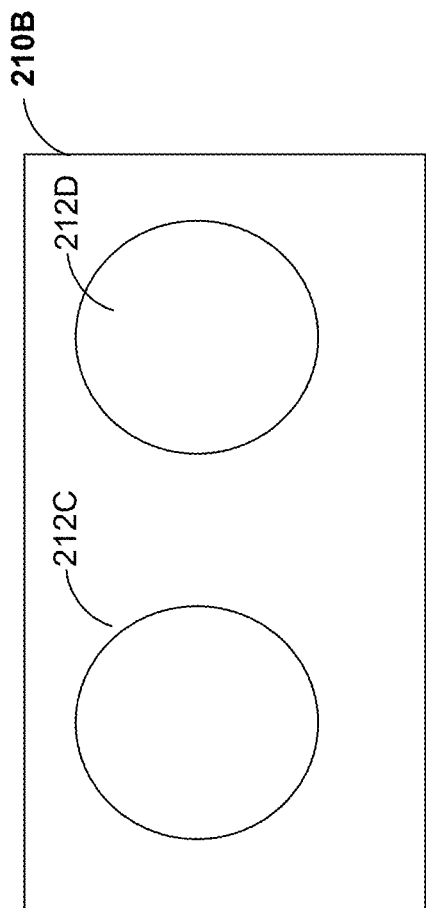
FIGS. 5A and 5B are block diagrams illustrating example devices for capturing omnidirectional image content, in accordance with one or more example techniques described in this disclosure.
Figure 5A:
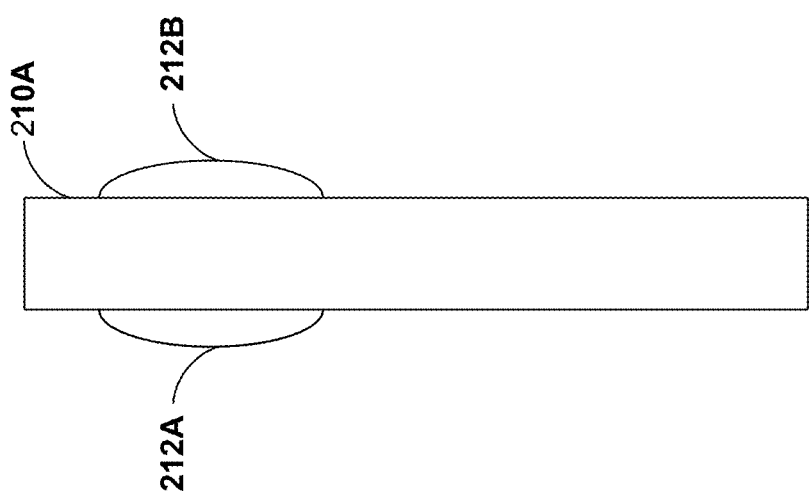

FIGS. 5A and 5B are block diagrams illustrating example devices for capturing omnidirectional image content in accordance with one or more example techniques described in this disclosure. As illustrated in FIG. 5A, computing device 210A is a video capture device that includes fisheye lens 212A and fisheye lens 212B located on opposite sides of computing device 210A to capture monoscopic image content that covers the entire sphere (e.g., full 360-degree video content). As illustrated in FIG. 5B, computing device 210B is a video capture device that includes fisheye lens 212C and fisheye lens 212D located on the same side of computing device 210B to capture stereoscopic image content that covers about half of the sphere. Computing device 210A or computing device 210B may be part of video source 24 of content preparation device 20 of FIG. 1.

As described above, a camera device includes a plurality of fisheye lenses. Some example camera devices include two fisheye lenses, but the example techniques are not limited to two fisheye lenses. One example camera device may include 16 lenses (e.g., 16-camera array for filming 3D VR content). Another example camera device may include eight lenses, each with a 195-degree angle of view (e.g., each lens captures 195 degrees of the 360 degrees of image content). Other example camera devices include three or four lenses. Some examples may include a 360-degree lens that captures 360-degrees of image content.

The example techniques described in this disclosure are generally described with respect to two fisheye lenses capturing omnidirectional image/video. However, the example techniques are not so limited. The example techniques may be applicable to example camera devices that include a plurality of lenses (e.g., two or more) even if the lenses are not fisheye lenses, and a plurality of fisheye lenses. For instance, the example techniques describe ways to stitch captured images, and the techniques may be applicable to examples where there are a plurality of captured images from a plurality of lenses (which may be fisheye lenses, as an example). While the example techniques are described with respect to two fisheye lenses, the example techniques are not so limited, and are applicable to the various camera types used for capturing omnidirectional images/videos.

Figure 6:
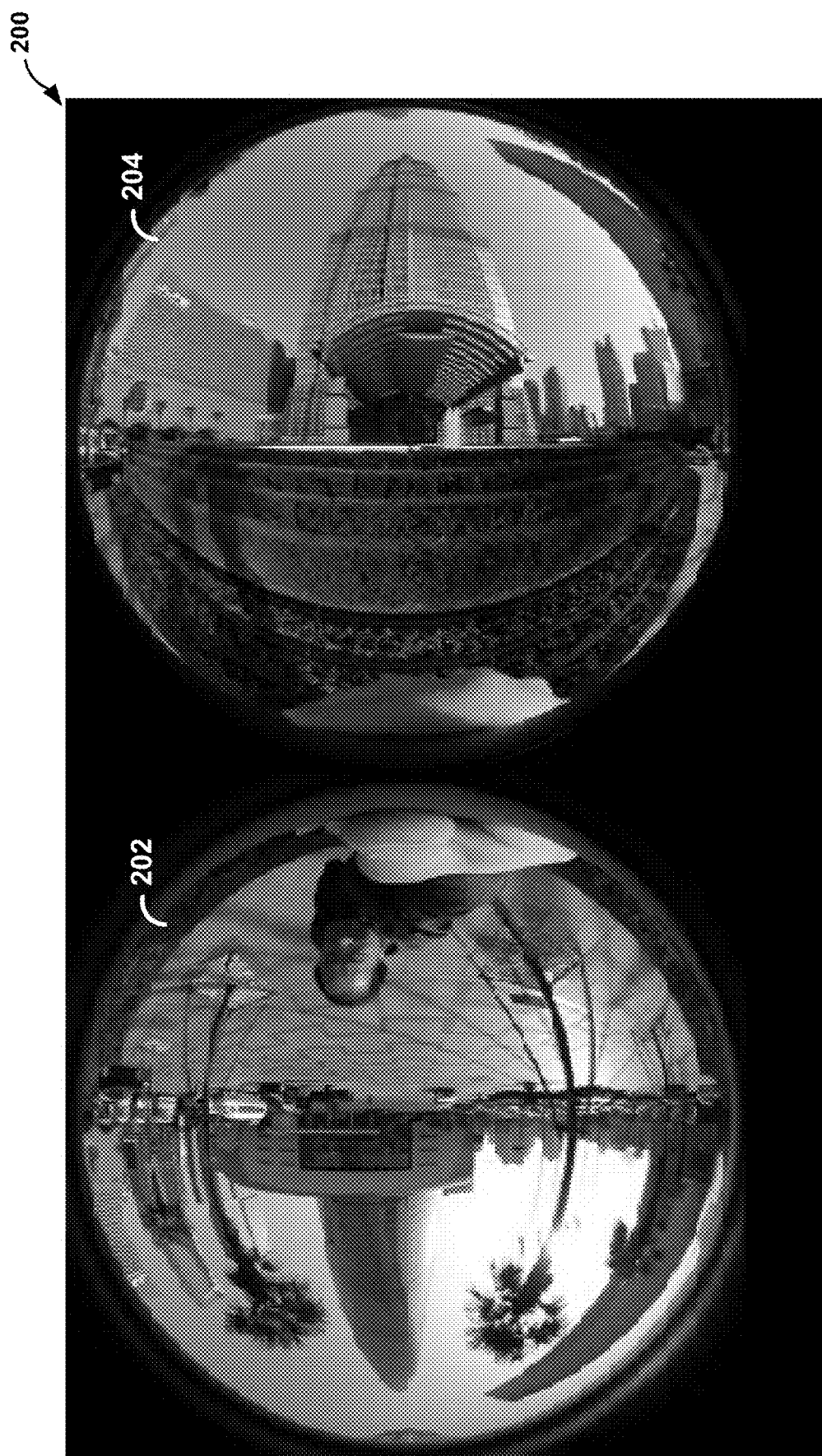
FIG. 6 is an image illustrating an example of multiple fisheye images per video picture.

Fisheye VR/360 video is supported in OMAF. At the time of this writing, the latest draft OMAF specification specifies a fisheye VR/360 video format, wherein instead of applying a projection and optionally a region-wise packing to generate the 2D video before encoding, for each access unit, the circular images from the capturing cameras are directly embedded in a 2D picture, for example, as shown in FIG. 6. FIG. 6 shows an example of multiple fisheye images per video picture. As shown in FIG. 6, first fisheye image 202 and second fisheye image 204 are embedded in 2D picture 200.

Such fisheye video is then encoded and the bitstream is encapsulated in an ISOBMFF file and may be further encapsulated as a DASH representation. In addition, the property of the fisheye video, including parameters indicating the characteristics of the fisheye video, may be signalled and used to correctly render the 360 video at the client side. One of the main advantages of the fisheye VR/360 video approach is that it supports low-cost user generated VR content by mobile terminals.

The use of the fisheye omnidirectional video scheme for the restricted video sample entry type 'resv' indicates that the decoded pictures are fisheye video pictures. The use of the fisheye omnidirectional video scheme is indicated by the value of a scheme_type syntax element equal to 'fodv' (fisheye omnidirectional video) within the SchemeTypeBox. The format of fisheye video is indicated with the FisheyeOmnidirectionalVideoBox contained within the SchemeInformationBox, which is included in the RestrictedSchemeInfoBox that is included in the sample entry. In some examples, one and only one FisheyeOmnidirectionalVideoBox shall be present in the SchemeInformationBox when the scheme type is 'fodv'. When FisheyeOmnidirectionalVideoBox is present in the SchemeInformationBox, StereoVideoBox and RegionWisePackingBox shall not be present in the same SchemeInformationBox. The FisheyeOmnidirectionalVideoBox, as specified in clause 6 of the OMAF DIS, contains the FisheyeOmnidirectionalVideoInfo( ) syntax structure that contains the fisheye video property parameters.

The syntax and semantics of the FisheyeOmnidirectionalVideoInfo( ) syntax structure are specified in Clause 6 of the latest draft OMAF specification. The syntax is as follows:

```
aligned(8) class FisheyeOmnidirectionalVideoInfo( ) {
    bit(24) reserved = 0;
    unsigned int(8) num_circular_images;
    for(i=0; i< num_circular_images; i++) {
        unsigned int(32) image_center_x;
        unsigned int(32) image_center_y;
        unsigned int(32) full_radius;
        unsigned int(32) picture_radius;
        unsigned int(32) scene_radius;
        unsigned int(32) image_rotation;
        bit(30) reserved = 0;
        unsigned int(2) image_flip;
        unsigned int(32) image_scale_axis_angle;
        unsigned int(32) image_scale_x;
        unsigned int(32) image_scale_y;
        unsigned int(32) field_of_view;
        bit(16) reserved = 0;
        unsigned int (16) num_angle_for_displaying_fov;
        for(j=0; j< num_angle_for_displaying_fov; j++) {
            unsigned int(32) displayed_fov;
            unsigned int(32) overlapped_fov;
        }
        signed int(32) camera_center_yaw;
        signed int(32) camera_center_pitch;
        signed int(32) camera_center_roll;
        unsigned int(32) camera_center_offset_x;
        unsigned int(32) camera_center_offset_y;
        unsigned int(32) camera_center_offset_z;
        bit(16) reserved = 0;
        unsigned int(16) num_polynomial_coefficeients;
        for(j=0; j< num_polynomial_coefficients; j++) {
            unsigned int(32) polynomial_coefficient_K;
        }
        bit(16) reserved = 0;
        unsigned int (16) num_local_fov_region;
        for(j=0; j<num_local_fov_region; j++) {
            unsigned int(32) start_radius;
            unsigned int(32) end_radius;
            signed int(32) start_angle;
            signed int(32) end_angle;
            unsigned int(32) radius_delta;
            signed int(32) angle_delta;
            for(rad=start_radius; rad<= end_radius; rad+= radius_delta) {
                for(ang=start_angle; ang<= ang_radius; ang+=angle_delta) {
                    unsigned int(32) local_fov_weight;
                }
            }
        }
        bit(16) reserved = 0;
        unsigned int(16) num_polynomial_coefficients_lsc;
        for(j=0; j< num_polynomial_coefficients_lsc; j++) {
            unsigned int (32) polynomial_coefficient_K_lsc_R;
            unsigned int (32) polynomial_coefficient_K_lsc_G;
            unsigned int (32) polynomial_coefficient_K_lsc_B;
        }
    }
    bit(24) reserved = 0;
    unsigned int(8) num_deadzones;
    for(i=0; i< num_deadzones; i++) {
        unsigned int(16) deadzone_left_horizontal_offset;
        unsigned int(16) deadzone_top_vertical_offset;
        unsigned int(16) deadzone_width;
        unsigned int(16) deadzone_height;
    }
}
```

The semantics of the FisheyeOmnidirectionalVideoInfo( ) syntax structure in the current draft of OMAF DIS is as follows.

num_circular_images specifies the number of circular images in the coded picture of each sample this box applies to. Typically, the value is equal to 2, but other non-zero values are also possible.

image_center_x is a fixed-point 16.16 value that specifies the horizontal coordinate, in luma samples, of the center of the circular image in the coded picture of each sample this box applies to.

image_center_y is a fixed-point 16.16 value that specifies the vertical coordinate, in luma samples, of the center of the circular image in the coded picture of each sample this box applies to.

full_radius is a fixed-point 16.16 value that specifies the radius, in luma samples, from the center of the circular image to the edge of the full round image.

picture_radius is a fixed-point 16.16 value that specifies the radius, in luma samples, from the center of the circular image to the closest edge of the image border. The circular fisheye image may be cropped by the camera picture. Therefore, this value indicates the radius of a circle wherein pixels are usable.

scene_radius is a fixed-point 16.16 value that specifies the radius, in luma samples, from the center of the circular image to the closest edge of the area in the image where it is guaranteed that there are no obstructions from the camera body itself and that within the enclosed area there is no lens distortion being too large for stitching.

image_rotation is a fixed-point 16.16 value that specifies the amount of rotation, in degrees, of the circular image. The image may be rotated by images +/−90 degrees, or +/−180 degrees, or any other value.

image_flip specifies whether and how the image has been flipped and thus a reverse flipping operation needs to be applied. The value 0 indicates that the image has not been flipped. The value 1 indicates that the image has been vertically flipped. The value 2 indicates that the image has been horizontally flipped. The value 3 indicates that the image has been both vertically and horizontally flipped.

image_scale_axis_angle, image_scale_x, and image_scale_y are three fixed-point 16.16 values that specify whether and how the image has been scaled along an axis. The axis is defined by a single angle as indicated by the value of image_scale_axis_angle, in degrees. An angle of 0 degrees means a horizontal vector is perfectly horizontal and a vertical vector is perfectly vertical. The values of image_scale_x and image_scale_y indicate the scaling ratios in the directions that are parallel and orthogonal, respectively, to the axis.

field_of_view is a fixed-point 16.16 value that specifies the field of view of the fisheye lens, in degrees. A typical value for a hemispherical fisheye lens is 180.0 degrees.

num_angle for displaying_fov specifies the number of angles. According to the value of num_angle for displaying_fov, multiple values of displayed_fov and overlapped_fov are defined with equal intervals, which start at 12 o'clock and go clockwise.

displayed_fov specifies the displayed field of view and the corresponding image area of each fisheye camera image. overlapped_fov specifies the region which includes overlapped regions, which are usually used for blending, in terms of the field of view between multiple circular images. The values of displayed_fov and overlapped_fov are smaller than or equal to the value of field_of_view.

NOTE: The value of field_of_view is determined by the physical property of each fisheye lens, while the values of displayed_fov and overlapped_fov are determined by the configuration of multiple fisheye lenses. For example, when the value of num_circular_images is equal to 2 and two lenses are symmetrically located, the value of displayed_fov and overlapped_fov can be set as 180 and 190 respectively, by default. However, the value can be changed depending on the configuration of the lens and the characteristics of the contents. For example, if the stitching quality with the displayed_fov values (left camera=170 and right camera=190) and the overlapped_fov values (left camera=185 and right camera=190) is better than the quality with the default values (180 and 190) or if the physical configuration of cameras is asymmetric, then the unequal displayed_fov and overlapped_fov values can be taken. In addition, when it comes to multiple (N>2) fisheye images, a single displayed_fov value cannot specify the exact area of each fisheye image. As shown in FIG. 6, displayed_fov (602) varies according to the direction. In order to manipulate multiple (N>2) fisheye images, num_angle for displaying_fov is introduced. For example, if this value is equal to 12, then the fisheye image is divided into 12 sectors where each sector angle is 30 degrees.

camera_center_yaw specifies the yaw angle, in units of $2^{-16}$ degrees, of the point that the center pixel of the circular image in the coded picture of each sample is projected to a spherical surface. This is the first of 3 angles that specify the camera extrinsic parameters relative to the global coordinate axes. camera_center_yaw shall be in the range of $-180*2^{16}$ to $180*2^{16}-1$, inclusive.

camera_center_pitch specifies the pitch angle, in units of $2^{-16}$ degrees, of the point that the center pixel of the circular image in the coded picture of each sample is projected to a spherical surface. camera_center_pitch shall be in the range of $-90*2^{16}$ to $90*2^{16}$, inclusive.

camera_center_roll specifies the roll angle, in units of $2^{-16}$ degrees, of the point that the center pixel of the circular image in the coded picture of each sample is projected to a spherical surface. camera_center_roll shall be in the range of $-180*2^{16}$ to $180*2^{16}-1$, inclusive.

camera_center_offset_x, camera_center_offset_y and camera_center_offset_z are fixed-point 8.24 values that indicate the XYZ offset values from the origin of unit sphere where pixels in the circular image in the coded picture are projected onto. camera_center_offset_x, camera_center_offset_y and camera_center_offset_z shall be in the range of −1.0 to 1.0, inclusive.

num_polynomial_coefficients is an integer that specifies the number of polynomial coefficients present. The list of polynomial coefficients polynomial_coefficient_K are fixed-point 8.24 values that represent the coefficients in the polynomial that specify the transformation from fisheye space to undistored planar image.

num_local_fov_region specifies the number of local fitting regions having different field of view.

start_radius, end_radius, start_angle, and end_angle specify the region for local fitting/warping to change the actual field of view for displaying locally. start_radius and end_radius are fixed-point 16.16 values that specify the minimum and maximum radius values. start_angle and end_angle specify the minimum and maximum angle values that start at 12 o'clock and increase clockwise, in units of $2^{-16}$ degrees. start_angle, and end_angle shall be in the range of $-180*2^{16}$ to $180*2^{16}-1$, inclusive.

radius_delta is a fixed-point 16.16 value that specifies the delta radius value for representing a different field of view for each radius.

angle_delta specifies the delta angle value, in units of $2^{-16}$ degrees, for representing a different field of view for each angle.

local_fov_weight is a 8.24 fixed point format which specifies the weighting value for the field of view of the position specified by start_radius, end_radius, start_angle, end_angle, the angle index i and the radius index j. The positive value of local_fov_weight specifies the expansion of field of view, while the negative value specifies the contraction of field of view.

num_polynomial_coefficeients_lsc shall be the order of the polynomial approximation of the lens shading curve.

polynomial_coefficient_K_lsc_R, polynomial_coefficient_K_lsc_G, and polynomial_coefficient_K_lsc_B are 8.24 fixed point formats that specify the LSC parameters to compensate the shading artifact which reduces colour along the radial direction. The compensating weight (w) to be multiplied to the original colour is approximated as a curve function of the radius from the image center using a polynomial expression. It is formulated as $w=\Sigma_{i=1}^{N}p_{i-1}\cdot r^{i-1}$, where p indicates the coefficient value equal to polynomial_coefficient_K_lsc_R, polynomial_coefficient_K_lsc_G or polynomial_coefficient_K_lsc_B, and r indicates the radius value after normalization by full_radius. N is equal to the value of num_polynomial_coefficeients_lsc.

num_deadzones is an integer that specifies the number of dead zones in the coded picture of each sample this box applies to.

deadzone_left_horizontal_offset, deadzone_top_vertical_offset, deadzone_width, and deadzone_height are integer values that specify the position and size of the deadzone rectangular area in which the pixels are not usable. deadzone_left_horizontal_offset and deadzone_top_vertical_offset specify the horizontal and vertical coordinates, respectively, in luma samples, of the upper left corner of the deadzone in the coded picture. deadzone_width and deadzone_height specify the width and height, respectively, in luma samples, of the deadzone. To save bits for representing the video, all pixels within a deadzone should be set to the same pixel value, e.g., all black.

High-level fisheye video signaling is addressed in item 4 of the MPEG document m40783. MPEG document m40783 describes the following high-level fisheye video signaling. The changes are indicated as follows: (where text surrounded by begin and end addition symbols: "[[+>]]" and "[[+<]]" respectfully, are additions, and text surrounded by begin and end deletion symbols: "[[->]]" and "[[-<]]" respectfully, are removals; other parts remain unchanged):

Use one of the initial 24 bits in FisheyeOmnidirectionalVideoInfo( ) to indicate whether the fisheye video is monoscopic or stereoscopic, and add a view ID for each circular image.

```
...
aligned(8) class FisheyeOmnidirectionalVideoInfo( ) {
    [[+>]]unsigned int(1) monoscopic_flag; [[+<]]
    bit(23) reserved = 0;
    unsigned int(8) num_circular_images;
    [[+>]]for(i=0; i< num_circular_images; i++) {
        unsigned int(8) view_id;
        bit(24) reserved = 0;
    }[[+<]]
    for(i=0; i< num_circular_images; i++) {
        unsigned int(32) image_center_x;
        unsigned int(32) image_center_y;
        ...
    }
}
```

[[+>]]monoscopic_flag equal to 1 indicates that the fisheye omnidirectional video is monoscopic. The value 0 indicates that the fisheye omnidirectional video is not monoscopic.
view_id indicates the view identifier of the view the circular image belongs to. When there are only two values of view_id 0 and 1 for all the circular images, the fisheye video is stereoscopic, the circular images with view_id equal to 0 belong to the left view, and the circular images with view_id equal to 1 belong to the right view. [[+<]]

This disclosure identifies problems and shortcomings in example proposed approaches to high-level signaling schemes directed to fisheye VR video. Below are three examples of such problems:
(1) Signalling fisheye video using a view identification syntax element (e.g., view_id) may not be optimal for fisheye cameras arranged spatially on a sphere surface (or other arrangements), as one circular image captured by one fisheye camera may belong to multiple views.
(2) Current techniques lack any mechanism for indicating if vide data is stereoscopic fisheye VR video.
(3) Current techniques lack any mechanisms for the signaling of high-level fisheye VR video information for DASH.

This disclosure describes techniques and functional improvements to reduce a number of issues in high-level signaling schemes for fisheye VR video. The proposed techniques described below may be applied independently and/or may be applied in combination.

In one example of the disclosure, to address issues involving the use of a view identification syntax element, content preparation device 20 may be configured to use one or more of the initial 24 reserved bits in a FisheyeOmnidirectionalVideoInfo( ) syntax structure (e.g., as defined in OMAF) to indicate fisheye video type information. For example, content preparation device 20 may use one or more of the initial 24 reserved bits in a FisheyeOmnidirectionalVideoInfo( ) syntax structure to indicate whether the fisheye video is monoscopic, stereoscopic (e.g., consisting of a left view and a right view), or otherwise (e.g., not monoscopic and not stereoscopic). Any hardware or software unit of content preparation device 20 may be configured to generate the bits of the FisheyeOmnidirectionalVideoInfo( ) syntax structure to indicate the fisheye video type information, including video encoder 28 and/or encapsulation unit 30. Content preparation device 20 may be configured to signal the FisheyeOmnidirectionalVideoInfo( ) syntax structure in an encoded video bitstream. In some examples, content preparation device 20 may be configured to indicate the fisheye video type information using two bits of the initial 24 reserved bits in the FisheyeOmnidirectionalVideoInfo( ) syntax structure. In other examples, content preparation device 20 may be configured to indicate the fisheye video type information using three bits of the initial 24 reserved bits in the FisheyeOmnidirectionalVideoInfo( ) syntax structure.

Client device 40 may be configured to receive the encoded video bitstream and parse the FisheyeOmnidirectionalVideoInfo( ) syntax structure. Client device 40 may be configured to decode the bits of the FisheyeOmnidirectionalVideoInfo( ) syntax structure that indicate the fisheye video type information. Based on the video type information, client device 40 may be configured to decode and/or process the fisheye video data in the encoded bitstream. For example, client device 40 may use different outputting, decapsulation, decoding, processing, and/or presentation techniques based on whether the video type information in the FisheyeOmnidirectionalVideoInfo( ) syntax structure indicates that the fisheye video data is indicated as being stereoscopic, monoscopic or otherwise (e.g., not monoscopic and not stereoscopic).

In another example of the disclosure, to address issues with involving indicating stereoscopic fisheye VR video, content preparation device 20 may be configured to generate and add a flag to a FisheyeOmnidirectionalVideoInfo( ) syntax structure to indicate, for each circular image of video data, fisheye video stereoscopic information. For example, the flag may indicate whether the circular image of fisheye video data belongs to the left or right view. Any hardware or software unit of content preparation device 20 may be configured to generate the flag in the FisheyeOmnidirectionalVideoInfo( ) syntax structure to indicate the fisheye video stereoscopic information, including video encoder 28 and/or encapsulation unit 30. Content preparation device 20 may be configured to signal the FisheyeOmnidirectionalVideoInfo( ) syntax structure in an encoded video bitstream.

Client device 40 may be configured to receive the encoded video bitstream and parse the FisheyeOmnidirectionalVideoInfo( ) syntax structure. Client device 40 may be configured to decode the flag of the FisheyeOmnidirectionalVideoInfo( ) syntax structure that indicates the fisheye video stereoscopic information. Based on the video type information, client device 40 may be configured to decode and/or process the fisheye video data in the encoded bitstream. For example, client device 40 may use different outputting, decapsulation, decoding, processing, and/or presentation techniques based on whether the fisheye video stereoscopic information in the FisheyeOmnidirectionalVideoInfo( ) syntax structure indicates that the fisheye video data belongs to the left view or the right view.

The following is an example implementation of the techniques described above for signalling bits and flags in the FisheyeOmnidirectionalVideoInfo( ) syntax structure to indicate fisheye video type information and fisheye video stereoscopic information The following syntax and semantics changes to the syntax structure FisheyeOmnidirectionalVideoInfo( ) are as follows (where text surrounded by begin and end addition symbols: "[[+>]]" and "[[+<]]" respectfully, are additions, and text surrounded by begin and end deletion symbols: "[[->]]" and "[[-]]" respectfully, are removals; other parts remain unchanged):

```
aligned(8) class FisheyeOmnidirectionalVideoInfo( ) {
    [[+>]]unsigned int(2) view_dimension_idc; [[+<]]
    bit([[+>]]22[[+<]][[->]]24[[-<]]) reserved = 0;
    unsigned int(8) num_circular_images;
    [[+>]]for(i=0; i< num_circular_images; i++)
        if (view_dimension_idc == 1) {
            unsigned int(1) left_view_flag;
            bit(7) reserved = 0;
        }[[+<]]
    for(i=0; i< num_circular_images; i++) {
        unsigned int(32) image_center_x;
        unsigned int(32) image_center_y;
        ...
    }
}
```

[[+>]]view_dimension_idc equal to 0 indicates that the fisheye omnidirectional video is monoscopic. The value 1 indicates that the fisheye omnidirectional video is stereoscopic (i.e., consisting of a left view and a right view). The value 2 indicates that the fisheye omnidirectional video is neither monoscopic nor stereoscopic. The value 3 is reserved. The value of left_view_flag equal to 1 indicates that the circular image belongs to the left view. The value 0 indicates that the circular image belongs to the right view. [[+<]]

In another example of the disclosure, to address issues with high-level fisheye VR video information for DASH, content preparation device 20 may be configured to generate a DASH fisheye video information (FVI) descriptor for signaling whether the fisheye video data is monoscopic, stereoscopic (e.g., consisting of a left view and a right view), or otherwise (e.g., not monoscopic and not stereoscopic). When stereoscopic, content preparation device 20 may be configured to generate, in the FVI descriptor, an indication of whether a circular image in a picture belongs to the left view or right view. Any hardware or software unit of content preparation device 20 may be configured to generate the FVI descriptor, including video encoder 28 and/or encapsulation unit 30. Content preparation device 20 may be configured to signal the FVI descriptor in an encoded video bitstream.

Client device 40 and/or server device 60 may be configured to receive the encoded video bitstream and parse the FVI descriptor. Client device 40 and/or server device 60 may be configured to decode the FVI descriptor. Based on the values of the FVI descriptor, client device 40 and/or server device 60 may be configured to decode and/or process the fisheye video data in the encoded bitstream. For example, client device 40 and servicer device 60 may use different outputting, decapsulation, decoding, processing, and/or presentation techniques based on whether the fisheye video stereoscopic information in the FVI descriptor indicates that the fisheye video data is indicated as being stereoscopic, monoscopic or otherwise (e.g., not monoscopic and not stereoscopic), or the fisheye video data belongs to the left view or the right view.

The following is an example of a proposed implementation of the FVI descriptor for DASH. This proposed embodiment implementation includes the following syntax and semantics.

A fisheye video information (FVI) SupplementalProperty element with a @schemeIdUri attribute equal to "urn:mpeg:omaf:fvi:2017" may be present at the adaptation set level (i.e., directly in an AdaptationSet element) and shall not be present in other levels (i.e., shall not be present at MPD level or directly in any Representation element).

The FVI descriptor indicates whether the fisheye video carried in each Representation is monoscopic, stereoscopic (i.e., consisting of a left view and a right view), or otherwise, and when stereoscopic, whether a circular image in a picture belongs to the left or right view.

The @value of the FVI descriptor with @schemeIdUri equal to "urn:mpeg:omaf:fvi:2017" is a comma separated list of values as specified in the following table:

| @value parameter for CC descriptor | Use | Description |
| --- | --- | --- |
| view_dimension_idc | M | Value 0 indicates that the fisheye omnidirectional video is monoscopic. Value 1 indicates that the fisheye omnidirectional video is stereoscopic (i.e., consisting of a left view and a right view). Value 2 indicates that the fisheye omnidirectional video is neither monoscopic nor stereoscopic. |
| left_view_idc | CM | Specifies a comma separated list of the left/right view indication. The n-th indication equal to 1 indicates that the n-th circular image in each picture belongs to the left view, and the n-th indication equal to 0 indicates that the n-th circular image in each picture belongs to the right view. If view_dimension_idc is equal to 1, left_view_flag shall be present. Otherwise, left_view_flag shall not be present. |

Figure 7:
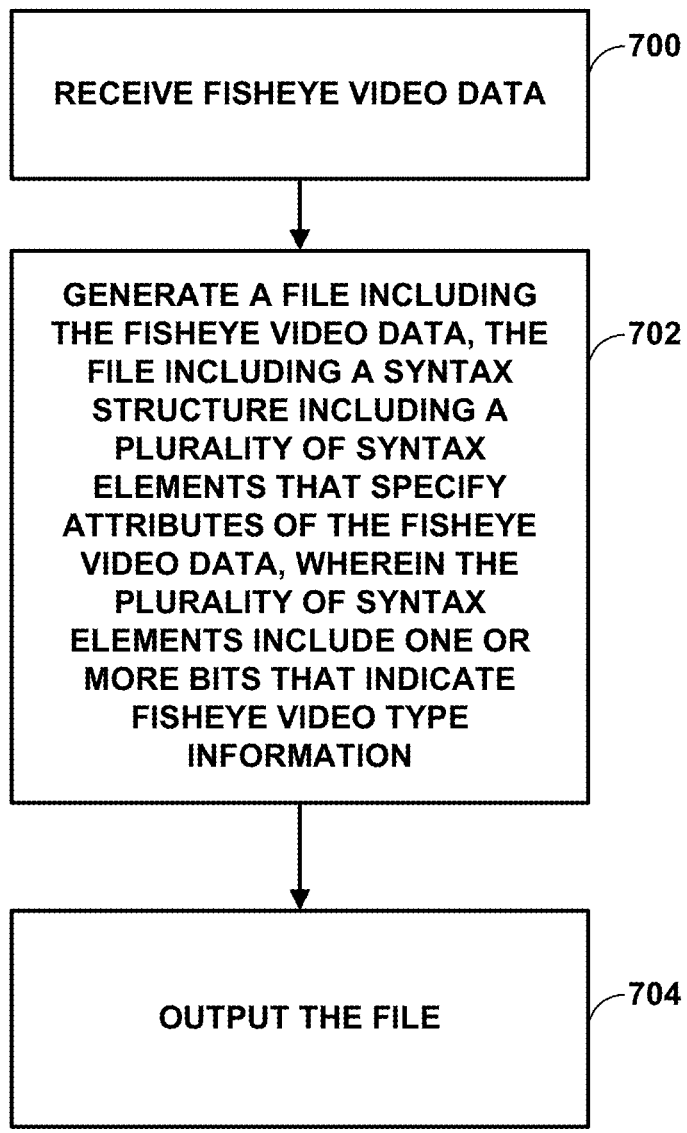
FIG. 7 is a flowchart showing an example method for generating a file according to techniques of this disclosure.

FIG. 7 is a flowchart showing an example method for generating a file according to techniques of this disclosure. The techniques of FIG. 7 may be performed by one or more structural units of content preparation device 20, including video encoder 28 and/or encapsulation unit 30.

In one example of the disclosure, content preparation device 20 may be configured to receive fisheye video data (700), generate a file including the fisheye video data, the file including a syntax structure including a plurality of syntax elements that specify attributes of the fisheye video data, wherein the plurality of syntax elements include one or more bits that indicate fisheye video type information (702), and output the file (704).

In one example, the fisheye video type information includes at least one of an indication of monoscopic fisheye video data or an indication of stereoscopic fisheye video data. In one example, the syntax structure is an Omnidirectional MediA Format FisheyeOmnidirectionalVideoInfo( ) syntax structure, and the one or more bits are two bits of an initial 24 reserved bits in the FisheyeOmnidirectionalVideoInfo( ) syntax structure.

In one example, the one or more bits are a view_dimension_idc syntax element, wherein a value of 0 for the view_dimension_idc syntax element indicates the fisheye video data is stereoscopic fisheye video data, and wherein a value of 1 for the view_dimension_idc syntax element indicates the fisheye video data is monoscopic fisheye video data. In one example, a value of 2 for the view_dimension_idc syntax element indicates the fisheye video data is neither monoscopic fisheye video data nor stereoscopic fisheye video data.

In one example, the fisheye video data is stereoscopic fisheye video data, and the syntax structure further includes one or more flags indicating whether images of the stereoscopic fisheye video data are in a left view or a right view. In one example, the one or more flags include a left_view_flag, wherein a value of 1 for the left_view_flag indicates a particular one of the images is in the left view, and wherein a value of 0 for the left_view_flag indicates a particular one of the images is in the right view.

Figure 8:
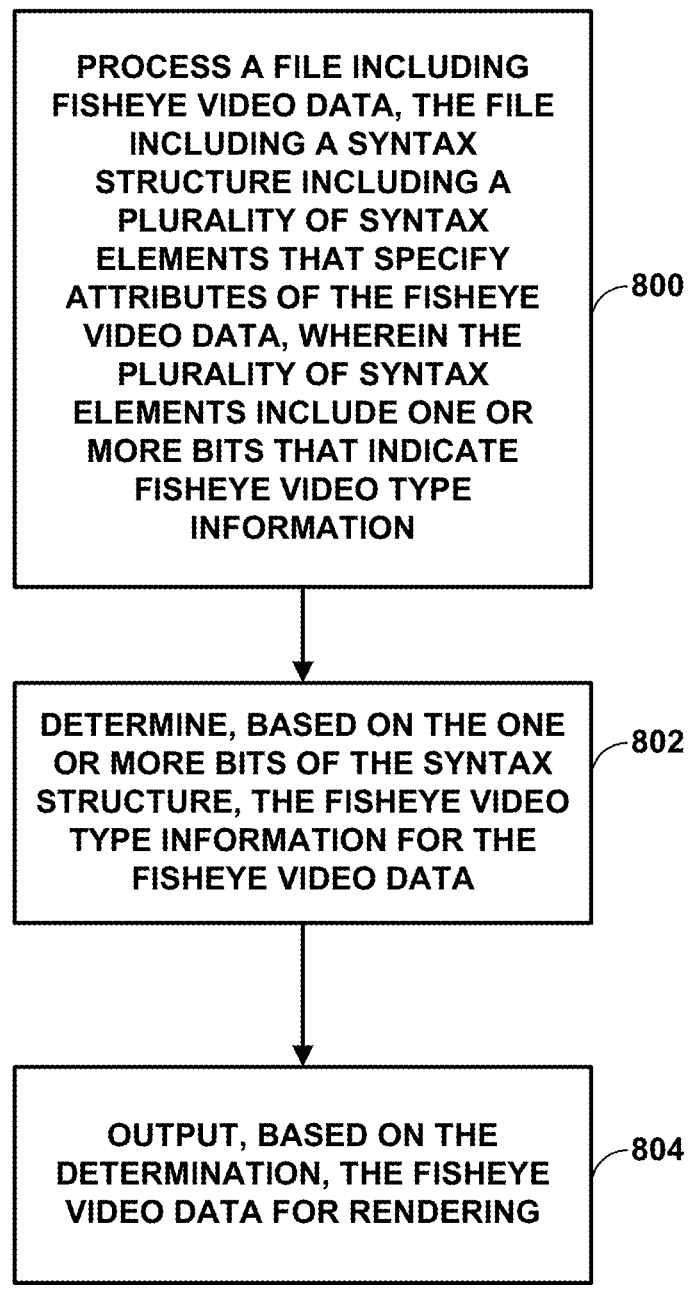
FIG. 8 is a flowchart showing an example method for processing a file according to techniques of this disclosure.

FIG. 8 is a flowchart showing an example method for processing a file according to techniques of this disclosure. The techniques of FIG. 8 may be performed by one or more structural units of client device 40, including video decoder 48 and/or decapsulation unit 50.

In one example of the disclosure, client device 40 may be configured to process a file including fisheye video data, the file including a syntax structure including a plurality of syntax elements that specify attributes of the fisheye video data, wherein the plurality of syntax elements include one or more bits that indicate fisheye video type information (800), determine, based on the one or more bits of the syntax structure, the fisheye video type information for the fisheye video data (802), and output, based on the determination, the fisheye video data for rendering (804).

In one example, the fisheye video type information includes at least one of an indication of monoscopic fisheye video data or an indication of stereoscopic fisheye video data. In one example, the syntax structure is an Omnidirectional MediA Format FisheyeOmnidirectionalVideoInfo( ) syntax structure, and the one or more bits are two bits of an initial 24 reserved bits in the FisheyeOmnidirectionalVideoInfo( ) syntax structure.

In one example, the one or more bits are a view_dimension_idc syntax element, wherein a value of 0 for the view_dimension_idc syntax element indicates the fisheye video data is stereoscopic fisheye video data, and wherein a value of 1 for the view_dimension_idc syntax element indicates the fisheye video data is monoscopic fisheye video data. In one example, a value of 2 for the view_dimension_idc syntax element indicates the fisheye video data is neither monoscopic fisheye video data nor stereoscopic fisheye video data.

In one example, the fisheye video data is stereoscopic fisheye video data, and the syntax structure further includes one or more flags indicating whether images of the stereoscopic fisheye video data are in a left view or a right view. In one example, the one or more flags include a left_view_flag, wherein a value of 1 for the left_view_flag indicates a particular one of the images is in the left view, and wherein a value of 0 for the left_view_flag indicates a particular one of the images is in the right view.

In one example, client device 40 may be further configured to determine, based on the one or more flags of the syntax structure, whether images of the stereoscopic fisheye video data are in the left view or the right view, and output, based on the determination, the stereoscopic fisheye video data for rendering.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing a file including fisheye video data, the method comprising:
processing a file including fisheye video data, the file including a syntax structure including a plurality of syntax elements that specify attributes of the fisheye video data, wherein the plurality of syntax elements include one or more bits that indicate fisheye video type information, and wherein the fisheye video type information includes an indication that the fisheye video data is monoscopic fisheye video data or an indication that the fisheye video data is stereoscopic fisheye video data, an indication of whether images of the stereoscopic fisheye video data are in a left view or a right view, an indication of a number of circular images of the fisheye video data, an indication of a horizontal coordinate of a center of a particular circular image of the fisheye video data, and an indication of a vertical coordinate of a center of the particular circular image of the fisheye video data;
   determining, based on the one or more bits of the syntax structure, the fisheye video type information for the fisheye video data; and
   outputting, based on the determination, the fisheye video data for rendering.

2. The method of claim 1, wherein the syntax structure is an Omnidirectional MediA Format FisheyeOmnidirectionalVideoInfo( ) syntax structure, and
   wherein the one or more bits are two bits of an initial 24 reserved bits in the FisheyeOmnidirectionalVideoInfo( ) syntax structure.

3. The method of claim 2, wherein the one or more bits are a view_dimension_idc syntax element, wherein a value of 0 for the view_dimension_idc syntax element indicates the fisheye video data is stereoscopic fisheye video data, and wherein a value of 1 for the view_dimension_idc syntax element indicates the fisheye video data is monoscopic fisheye video data.

4. The method of claim 3, wherein a value of 2 for the view_dimension_idc syntax element indicates the fisheye video data is neither monoscopic fisheye video data nor stereoscopic fisheye video data.

5. The method of claim 1, wherein the fisheye video data is stereoscopic fisheye video data, and wherein the syntax structure further includes one or more flags indicating whether images of the stereoscopic fisheye video data are in a left view or a right view.

6. The method of claim 5, wherein the one or more flags include a left_view_flag, wherein a value of 1 for the left_view_flag indicates a particular one of the images is in the left view, and wherein a value of 0 for the left_view_flag indicates a particular one of the images is in the right view.

7. The method of claim 5, further comprising:
   determining, based on the one or more flags of the syntax structure, whether images of the stereoscopic fisheye video data are in the left view or the right view; and
   outputting, based on the determination, the stereoscopic fisheye video data for rendering.

8. An apparatus configured to process a file including video data, the apparatus comprising:
   a memory configured to store the file; and
   one or more processors in communication with the memory, the one or more processors configured to:
      process the file including fisheye video data, the file including a syntax structure including a plurality of syntax elements that specify attributes of the fisheye video data, wherein the plurality of syntax elements include one or more bits that indicate fisheye video type information, and wherein the fisheye video type information includes an indication that the fisheye video data is monoscopic fisheye video data or an indication that the fisheye video data is stereoscopic fisheye video data, an indication of whether images of the stereoscopic fisheye video data are in a left view or a right view, an indication of a number of circular images of the fisheye video data, an indication of a horizontal coordinate of a center of a particular circular image of the fisheye video data, and an indication of a vertical coordinate of a center of the particular circular image of the fisheye video data;
      determine, based on the one or more bits of the syntax structure, the fisheye video type information for the fisheye video data; and
      output, based on the determination, the fisheye video data for rendering.

9. The apparatus of claim 8, wherein the syntax structure is an Omnidirectional MediA Format FisheyeOmnidirectionalVideoInfo( ) syntax structure, and
   wherein the one or more bits are two bits of an initial 24 reserved bits in the FisheyeOmnidirectionalVideoInfo( ) syntax structure.

10. The apparatus of claim 9, wherein the one or more bits are a view_dimension_idc syntax element, wherein a value of 0 for the view_dimension_idc syntax element indicates the fisheye video data is stereoscopic fisheye video data, and wherein a value of 1 for the view_dimension_idc syntax element indicates the fisheye video data is monoscopic fisheye video data.

11. The apparatus of claim 10, wherein a value of 2 for the view_dimension_idc syntax element indicates the fisheye video data is neither monoscopic fisheye video data nor stereoscopic fisheye video data.

12. The apparatus of claim 8, wherein the fisheye video data is stereoscopic fisheye video data, and wherein the syntax structure further includes one or more flags indicating whether images of the stereoscopic fisheye video data are in a left view or a right view.

13. The apparatus of claim 12, wherein the one or more flags include a left_view_flag, wherein a value of 1 for the left_view_flag indicates a particular one of the images is in the left view, and wherein a value of 0 for the left_view_flag indicates a particular one of the images is in the right view.

14. The apparatus of claim 12, wherein the one more processors are further configured to:
   determine, based on the one or more flags of the syntax structure, whether images of the stereoscopic fisheye video data are in the left view or the right view; and
   output, based on the determination, the stereoscopic fisheye video data for rendering.

15. An apparatus configured to process a file including video data, the apparatus comprising:
   means for processing a file including fisheye video data, the file including a syntax structure including a plurality of syntax elements that specify attributes of the fisheye video data, wherein the plurality of syntax elements include one or more bits that indicate fisheye video type information, and wherein the fisheye video type information includes an indication that the fisheye video data is monoscopic fisheye video data or an indication that the fisheye video data is stereoscopic fisheye video data, an indication of whether images of the stereoscopic fisheye video data are in a left view or a right view, an indication of a number of circular images of the fisheye video data, an indication of a horizontal coordinate of a center of a particular circular image of the fisheye video data, and an indication of a vertical coordinate of a center of the particular circular image of the fisheye video data;
   means for determining, based on the one or more bits of the syntax structure, the fisheye video type information for the fisheye video data; and
   means for outputting, based on the determination, the fisheye video data for rendering.

16. A non-transitory computer-readable storage medium storing instructions that, when executed, cause one or more processors to:
- process a file including fisheye video data, the file including a syntax structure including a plurality of syntax elements that specify attributes of the fisheye video data, wherein the plurality of syntax elements include one or more bits that indicate fisheye video type information, and wherein the fisheye video type information includes an indication that the fisheye video data is monoscopic fisheye video data or an indication that the fisheye video data is stereoscopic fisheye video data, an indication of whether images of the stereoscopic fisheye video data are in a left view or a right view, an indication of a number of circular images of the fisheye video data, an indication of a horizontal coordinate of a center of a particular circular image of the fisheye video data, and an indication of a vertical coordinate of a center of the particular circular image of the fisheye video data;
- determine, based on the one or more bits of the syntax structure, the fisheye video type information for the fisheye video data; and
- output, based on the determination, the fisheye video data for rendering.

17. A method of generating a file including video data, the method comprising:
- receiving fisheye video data;
- generating a file including the fisheye video data, the file including a syntax structure including a plurality of syntax elements that specify attributes of the fisheye video data, wherein the plurality of syntax elements include one or more bits that indicate fisheye video type information, and wherein the fisheye video type information includes an indication that the fisheye video data is monoscopic fisheye video data or an indication that the fisheye video data is stereoscopic fisheye video data, an indication of whether images of the stereoscopic fisheye video data are in a left view or a right view, an indication of a number of circular images of the fisheye video data, an indication of a horizontal coordinate of a center of a particular circular image of the fisheye video data, and an indication of a vertical coordinate of a center of the particular circular image of the fisheye video data; and
- outputting the file.

18. The method of claim 17, wherein the syntax structure is an Omnidirectional MediA Format FisheyeOmnidirectionalVideoInfo( ) syntax structure, and
- wherein the one or more bits are two bits of an initial 24 reserved bits in the FisheyeOmnidirectionalVideoInfo( ) syntax structure.

19. The method of claim 18, wherein the one or more bits are a view_dimension_idc syntax element, wherein a value of 0 for the view_dimension_idc syntax element indicates the fisheye video data is stereoscopic fisheye video data, and wherein a value of 1 for the view_dimension_idc syntax element indicates the fisheye video data is monoscopic fisheye video data.

20. The method of claim 19, wherein a value of 2 for the view_dimension_idc syntax element indicates the fisheye video data is neither monoscopic fisheye video data nor stereoscopic fisheye video data.

21. The method of claim 17, wherein the fisheye video data is stereoscopic fisheye video data, and wherein the syntax structure further includes one or more flags indicating whether images of the stereoscopic fisheye video data are in a left view or a right view.

22. The method of claim 21, wherein the one or more flags include a left_view_flag, wherein a value of 1 for the left_view_flag indicates a particular one of the images is in the left view, and wherein a value of 0 for the left_view_flag indicates a particular one of the images is in the right view.

23. An apparatus configured to generate a file including video data, the apparatus comprising:
- a memory configured to store the file; and
- one or more processors in communication with the memory, the one or more processors configured to:
  - receive fisheye video data;
  - generate the file including the fisheye video data, the file including a syntax structure including a plurality of syntax elements that specify attributes of the fisheye video data, wherein the plurality of syntax elements include one or more bits that indicate fisheye video type information, and wherein the fisheye video type information includes an indication that the fisheye video data is monoscopic fisheye video data or an indication that the fisheye video data is stereoscopic fisheye video data, an indication of whether images of the stereoscopic fisheye video data are in a left view or a right view, an indication of a number of circular images of the fisheye video data, an indication of a horizontal coordinate of a center of a particular circular image of the fisheye video data, and an indication of a vertical coordinate of a center of the particular circular image of the fisheye video data; and
  - output the file.

24. The apparatus of claim 23, wherein the syntax structure is an Omnidirectional MediA Format FisheyeOmnidirectionalVideoInfo( ) syntax structure, and
- wherein the one or more bits are two bits of an initial 24 reserved bits in the FisheyeOmnidirectionalVideoInfo( ) syntax structure.

25. The apparatus of claim 24, wherein the one or more bits are a view_dimension_idc syntax element, wherein a value of 0 for the view_dimension_idc syntax element indicates the fisheye video data is stereoscopic fisheye video data, and wherein a value of 1 for the view_dimension_idc syntax element indicates the fisheye video data is monoscopic fisheye video data.

26. The apparatus of claim 25, wherein a value of 2 for the view_dimension_idc syntax element indicates the fisheye video data is neither monoscopic fisheye video data nor stereoscopic fisheye video data.

27. The apparatus of claim 23, wherein the fisheye video data is stereoscopic fisheye video data, and wherein the syntax structure further includes one or more flags indicating whether images of the stereoscopic fisheye video data are in a left view or a right view.

28. The apparatus of claim 27, wherein the one or more flags include a left_view_flag, wherein a value of 1 for the left_view_flag indicates a particular one of the images is in the left view, and wherein a value of 0 for the left_view_flag indicates a particular one of the images is in the right view.

29. An apparatus configured to generate a file including video data, the apparatus comprising:
- means for receiving fisheye video data;
- means for generating a file including the fisheye video data, the file including a syntax structure including a plurality of syntax elements that specify attributes of the fisheye video data, wherein the plurality of syntax elements include one or more bits that indicate fisheye video type information, and wherein the fisheye video type information includes an indication that the fisheye video data is monoscopic fisheye video data or an indication that the fisheye video data is stereoscopic fisheye video data, an indication of whether images of the stereoscopic fisheye video data are in a left view or a right view, an indication of a number of circular images of the fisheye video data, an indication of a horizontal coordinate of a center of a particular circular image of the fisheye video data, and an indication of a vertical coordinate of a center of the particular circular image of the fisheye video data; and means for outputting the file.

30. A non-transitory computer-readable storage medium storing instructions that, when executed, cause one or more processors to:

receive fisheye video data;

generate a file including the fisheye video data, the file including a syntax structure including a plurality of syntax elements that specify attributes of the fisheye video data, wherein the plurality of syntax elements include one or more bits that indicate fisheye video type information, and wherein the fisheye video type information includes an indication that the fisheye video data is monoscopic fisheye video data or an indication that the fisheye video data is stereoscopic fisheye video data, an indication of whether images of the stereoscopic fisheye video data are in a left view or a right view, an indication of a number of circular images of the fisheye video data, an indication of a horizontal coordinate of a center of a particular circular image of the fisheye video data, and an indication of a vertical coordinate of a center of the particular circular image of the fisheye video data; and output the file.

* * * * *